(12) United States Patent
Oshima et al.

(10) Patent No.: US 7,047,599 B2
(45) Date of Patent: May 23, 2006

(54) HINGE ASSEMBLY

(75) Inventors: Kazuyoshi Oshima, Naruto-machi (JP);
Katsuya Imai, Tako-machi (JP)

(73) Assignee: Sugatsune Kogyo Co., Ltd., Tokyo (JP)

( * ) Notice: Subject to any disclaimer, the term of this patent is extended or adjusted under 35 U.S.C. 154(b) by 892 days.

(21) Appl. No.: 09/997,703

(22) Filed: Nov. 30, 2001

(65) Prior Publication Data

US 2002/0069482 A1 Jun. 13, 2002

(30) Foreign Application Priority Data

Dec. 11, 2000 (JP) ............................. 2000-376173

(51) Int. Cl.
*E05F 1/08* (2006.01)
(52) U.S. Cl. .......................................... 16/337; 16/273
(58) Field of Classification Search ................. 16/342, 16/273, 274, 340, 376, 337, 374, 303; 361/680–683
See application file for complete search history.

(56) References Cited

U.S. PATENT DOCUMENTS 5,867,872 A * 2/1999 Katoh ........................ 16/337
6,038,739 A * 3/2000 Katoh ........................ 16/342
6,408,485 B1 * 6/2002 Wu ............................ 16/342
6,421,878 B1 * 7/2002 Kaneko et al. ............ 16/330
6,453,509 B1 * 9/2002 Shin .......................... 16/340
6,532,628 B1 * 3/2003 Kim .......................... 16/342
6,568,034 B1 * 5/2003 Cho .......................... 16/337

FOREIGN PATENT DOCUMENTS

JP           07-047579          11/1995

* cited by examiner

*Primary Examiner*—Robert J. Sandy
*Assistant Examiner*—Andre' L. Jackson
(74) *Attorney, Agent, or Firm*—Brown & Michaels, PC (57) ABSTRACT

An abutment member 4 of a first hinge member A1 is pressed against a cam member 8 of a second hinge member A2 by a coiled spring 6. By this, an interval between an enlarged diameter portion 31 of an insertion member 3 of the first hinge member A1 and a connecting plate portion 72 of the second hinge member A2, is restricted to a predetermined interval. In other words, an interval between the end faces 31*a*, 72*a* of the enlarged diameter portion 31 and the connecting plate portion 72 is restricted to a predetermined interval. A friction member 10 composed of an elastic material such as a rubber is disposed between the end faces 31*a*, 72*a*. The thickness of the friction member 10 in the opposing direction of the end faces 31*a*, 72*a* is larger than the interval between the end faces 31*a*, 72*a*.

5 Claims, 10 Drawing Sheets

HINGE ASSEMBLY

BACKGROUND OF THE INVENTION

This invention relates to a hinge assembly capable of turnably connecting a device main body and a cover together in a notebook type personal computer, an electronic dictionary or the like and stopping the cover in an optional closed position.

In general, a hinge assembly of this type has one pair of hinge members. The pair of hinge members are non-turnably connected to the device main body and the cover and turnably connected to each other. By this, the device main body and the cover are turnably connected together.

The hinge assembly includes a movable member connected to one of the hinge members such that the movable member is non-turnable but movable in a direction of an axis of rotation. A friction member is disposed between this movable member and the other hinge member. The friction member is press contacted with the other hinge member and the movable member by a coiled spring (biasing means) for biasing the movable member towards the other hinge member side. Accordingly, when the pair of hinge members are about to turn or are being turned, a frictional resistance corresponding in size to the biasing force of the coiled spring is generated between the other hinge member and the movable member. This frictional resistance is set larger than a rotational torque of the cover caused by its dead weight. Accordingly, the cover can be stopped in an optional open position (see Japanese Utility Model Publication No. H07-47579).

In the above-mentioned conventional hinge assembly, since a coiled spring is used in order to obtain a frictional resistance for stopping the cover, there is involved such a problem that the hinge assembly is increased in size to that extent. Moreover, the coiled spring used as a biasing means is difficult to keep its biasing force at a fixed level and the biasing force tends to be greatly fluctuated. Accordingly, the frictional resistance caused by the frictional member becomes irregular at every hinge assembly. As a result, a turning resistance of the cover becomes irregular at every notebook type personal computer.

SUMMARY OF THE INVENTION

This invention has been accomplished in order to solve the above-mentioned problems. According to the present invention, there is provided a hinge assembly comprising a first and a second hinge member relatively turnably connected together about an axis of rotation and a friction member composed of an elastic material such as a rubber and disposed between the first and second hinge members, relative turning motion between the first hinge member and the second hinge member being restricted by friction resistance generated between contact surfaces of the friction member and the first and second hinge members, the hinge assembly further comprising interval restricting means disposed between the first hinge member and the second hinge member and adapted to restrict intervals of the contact surfaces of the first and second hinge members with respect to the friction member.

In this case, it is accepted that the interval restricting means includes an abutment portion disposed at least at one of opposing surfaces of the first and second hinge members and for restricting the intervals of the contact surfaces of the first and second hinge members with respect to the friction member by being abutted with the other opposing surface.

It is also accepted that the first hinge member includes a main body and a movable portion disposed on the main body such that the movable portion is non-turnable but movable in a direction of the axis of rotation, and the friction member and the interval restricting means are disposed between the movable portion and the second hinge member.

It is also accepted that the first hinge member includes a main body and a movable portion, the movable portion includes an insertion member connected to the main body such that the insertion member is non-turnable but movable in the direction of the axis of rotation and axially pierced through the second hinge member such that the insertion member is turnable and movable in a direction of the axis of rotation, and a first and second opposing portions disposed at opposite end portions of the insertion member and opposing to opposite end faces of the second hinge member, the interval restricting means is disposed between the first opposing portion and the second hinge member, and the friction member is disposed between the second opposing portion and the second hinge member. In this case, it is preferred that the interval restricting means includes a moving mechanism for moving the insertion member in the direction of the axis of rotation in response to the turning motion of the second hinge member within a predetermined turning range. It is also preferred that the moving mechanism includes biasing means for biasing the insertion member so that the second opposing portion is brought towards the second hinge member, and a cam mechanism disposed between the second opposing portion and the second hinge member and for moving the insertion member against biasing force of the biasing means so that when the hinge member is turned in one direction, the second opposing portion is brought away from the second hinge member, and for moving the insertion member by the biasing force of the biasing means so that when the second hinge member is turned in the other direction, the second opposing portion is brought towards the second hinge member.

BRIEF DESCRIPTION OF THE DRAWINGS

FIG. 12(A) is a front view thereof, FIGS. 12(B) and 12(C) are sectional views taken on lines B-B and C–C of FIG. 12(A), respectively;

FIG. 13(A) is a vertical sectional view thereof, FIGS. 12(B) and 12(C) are views when viewed in a direction as indicated by arrows B and C of FIG. 13(A), respectively;

FIG. 14(A) is an enlarged plan view thereof, and FIG. 14(B) is a sectional view taken on line B—B FIG. 14(A);

FIG. 15(A) is a front view thereof, FIGS. 15(B) and 15(C) are views when viewed in a direction as indicated by arrows B and C of FIG. 15(A), respectively; FIG. 16(A) is an enlarged plan view thereof, and FIG. 16(B) is a sectional view taken on line B—B of FIG. 16(A).

DETAILED DESCRIPTION OF THE INVENTION

The present invention will be described in the form of one embodiment hereinafter with reference to FIGS. 1 through 16, in which the present invention is applied to a notebook type personal computer. Of course, the present invention can be applied to an electronic pocket notebook and the like other than the notebook type personal computer.

Figure 1:
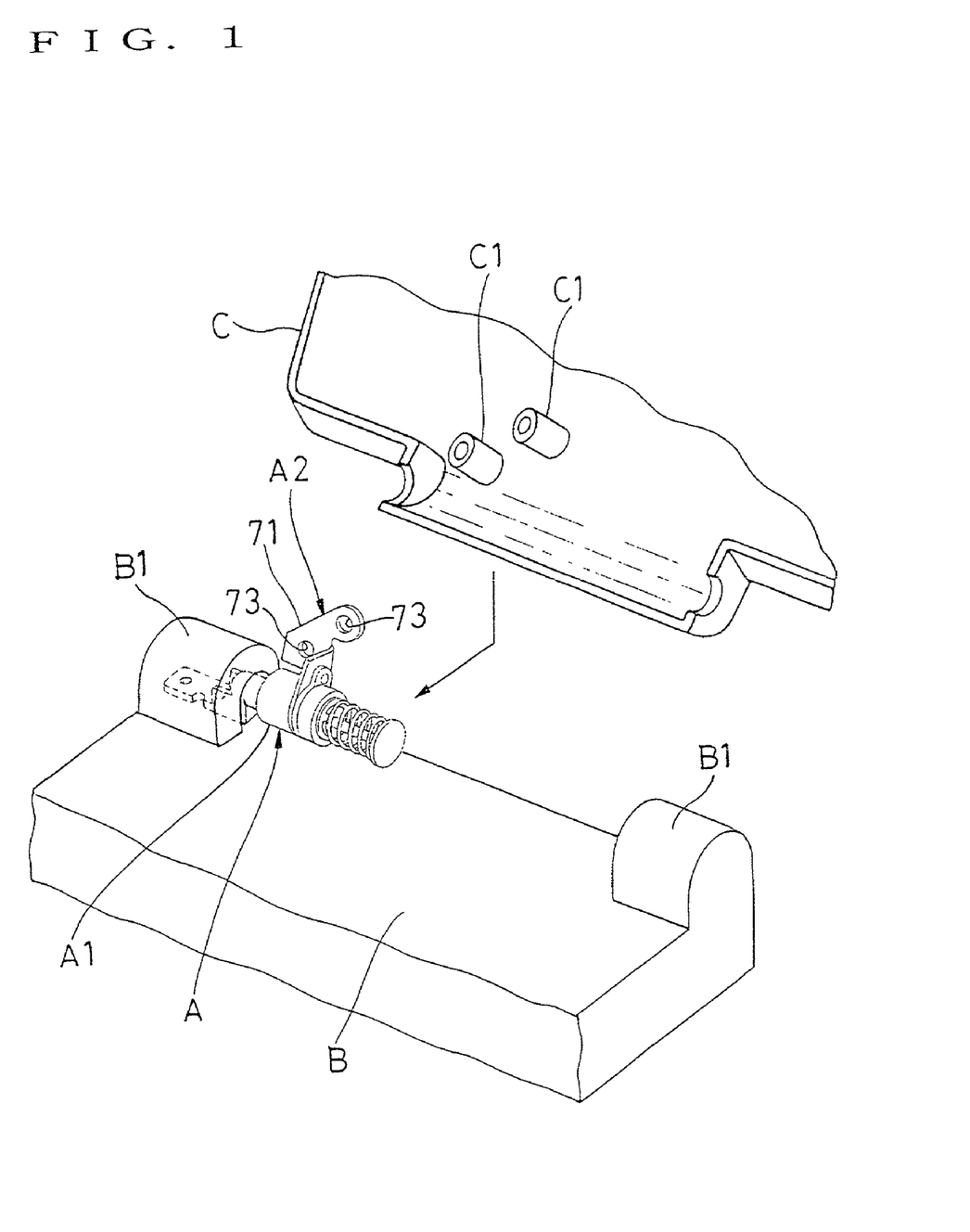
FIG. 1 is an exploded perspective view showing a part of a notebook type personal computer in which a hinge assembly according to the present invention is employed.

FIG. 1 shows a device main body B and a cover C of a notebook type personal computer in which a hinge assembly A according to the present invention is employed. The device main body B has one pair of connecting cylindrical portions B1, B1 formed on opposite sides of one end portion thereof. The connecting portions B1, B1 are open at inner end portions (mutually opposing end portions) thereof and closed at outer end portions thereof. The one pair of connecting portions B1, B1 are arranged such that their axes are aligned with each other.

Figure 2:
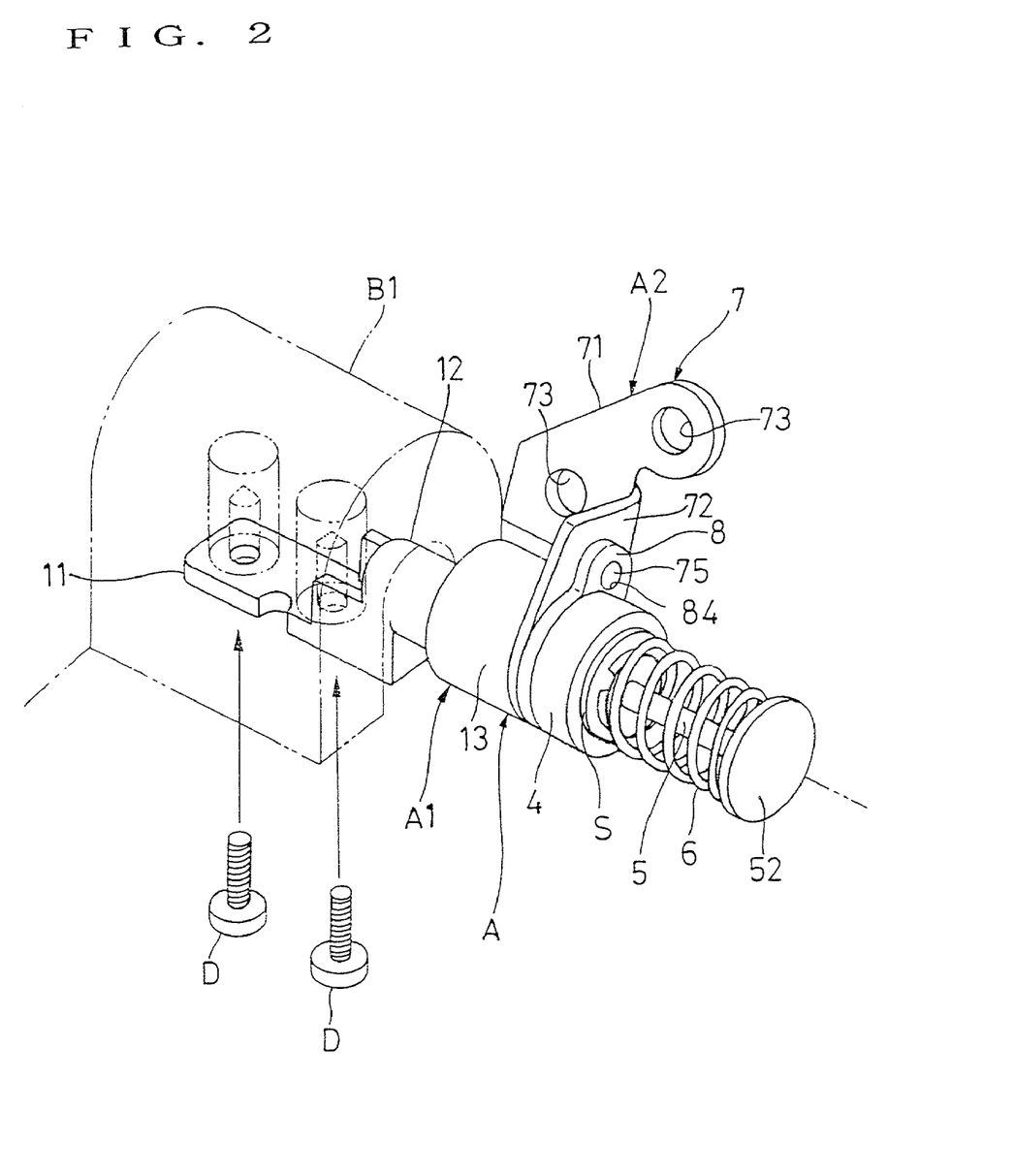
FIG. 2 is a perspective view showing how to attach the hinge assembly to a main body of the notebook type personal computer.
Figure 3:
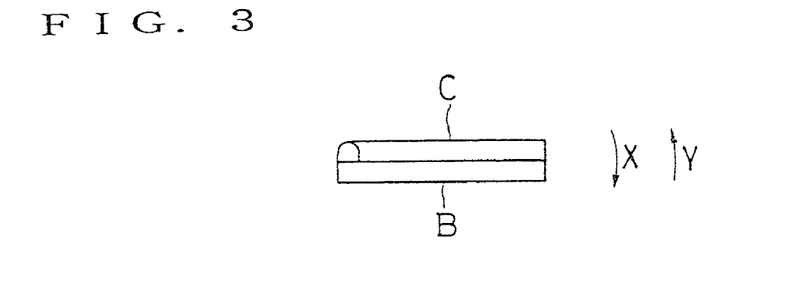
FIG. 3 is a side view showing one state of the notebook type personal computer in which a cover is turned in a closed position.
Figure 4:
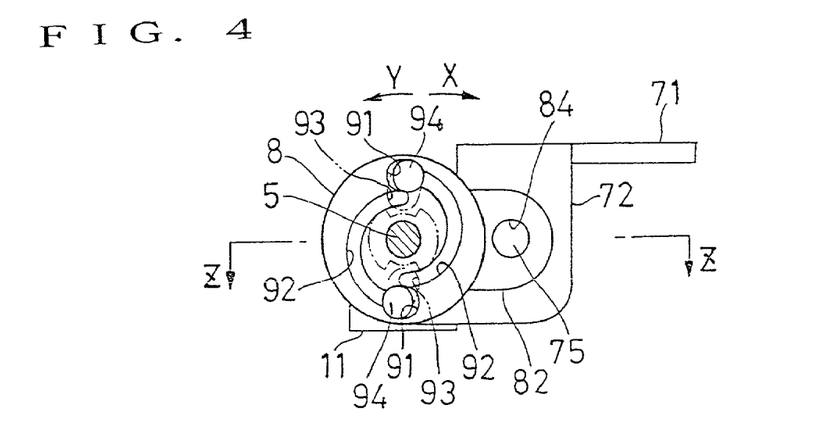
FIG. 4 is a sectional view taken on line X—X of FIG. 5, showing the hinge assembly when the notebook type personal computer is in the state of FIG. 3.

A basal end portion of the hinge assembly A is inserted in the connecting cylindrical portion BI and fixed by screws D as shown in FIG. 2. By this, the basal portion of the hinge assembly A is fixed to the device main body B. A distal end portion of the hinge assembly A projects outside from the connecting cylindrical portion B1. The cover C is fixed to the projected distal end portion. As a result, the cover C is turnably connected to the device main body B about the axis of the connecting cylindrical portion B1 through the hinge assembly A. The cover C can turn about 180 degrees from a closed position (see FIG. 3) where the cover C is abutted with an upper surface of the device main body B to a fully open position (see FIG. 9) via a half-open position (see FIG. 6) where the cover C is generally upright with respect to device main body B.

Next, the hinge assembly A will be described with reference to FIGS. 2, 5, 8 and 11, and FIGS. 12 through 16 which show the parts of the hinge assembly A. The hinge assembly A includes a first hinge member (hinge member) Al fixed to the device main body B and a second hinge member (hinge member) A2 fixed to the cover C. The first and second hinge members A1, A2 are turnably connected together about an axis of rotation (the axis of the connecting cylindrical portion B1) between the device main body B and the cover C.

Figure 5:
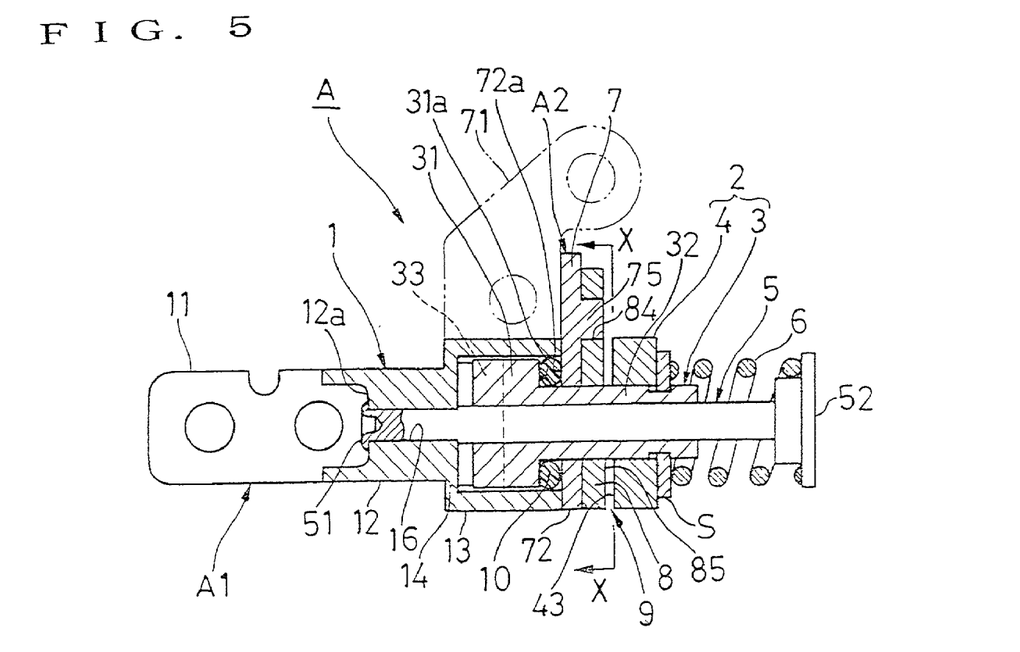
FIG. 5 is a sectional view taken on line Z—Z of FIG. 4.
Figure 6:
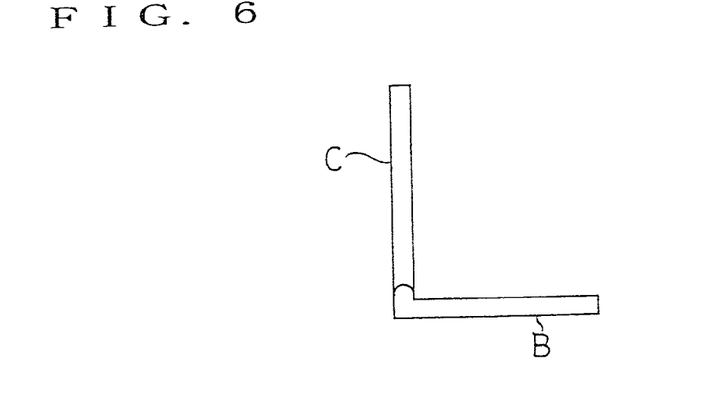
FIG. 6 is a side view of the notebook type personal computer with the cover turned in an upright position (half-open position)
Figure 7:
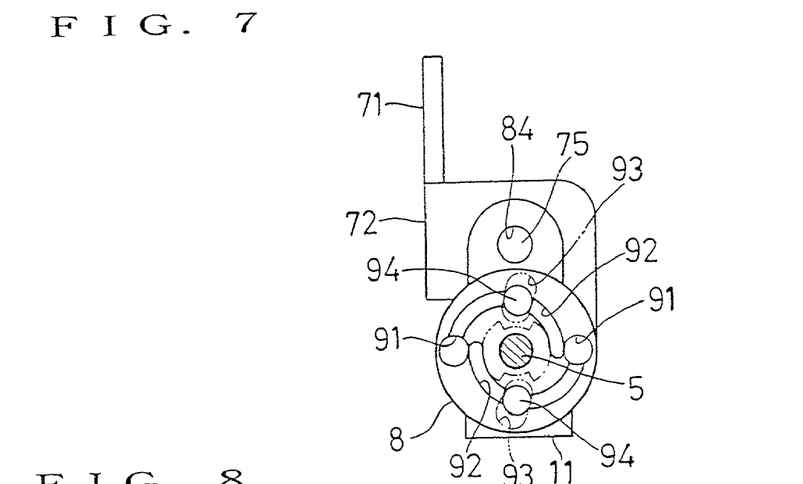
FIG. 7 is a sectional view, like FIG. 4, showing the hinge assembly when the notebook type personal computer is in a state of FIG. 6.
Figure 8:
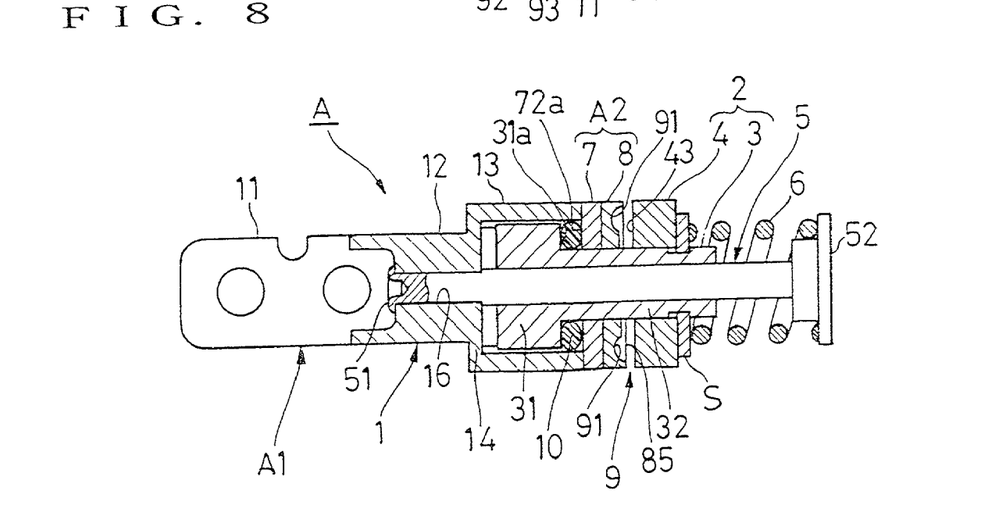
FIG. 8 is a sectional view, like FIG. 5, of FIG. 7.
Figure 9:
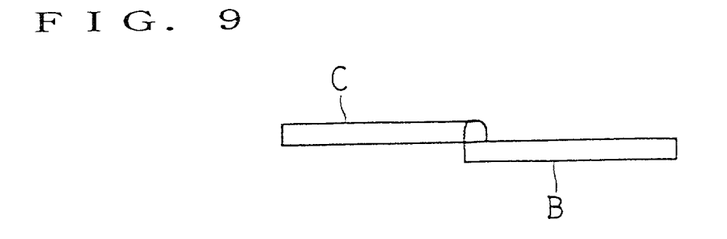
FIG. 9 is a side view showing the notebook type personal computer with the cover turned in a fully open position.
Figure 10:
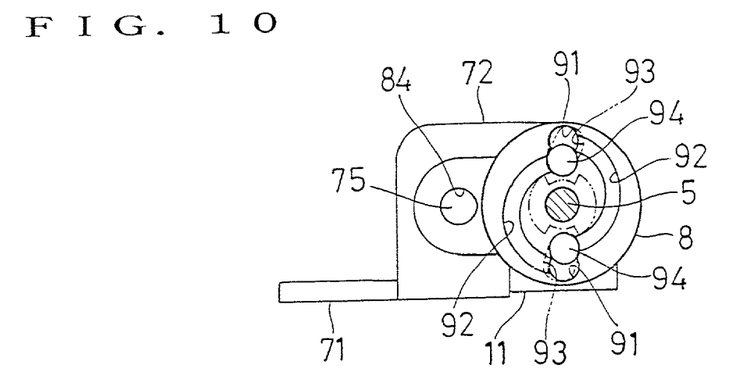
FIG. 10 is a sectional view, like FIG. 4, showing the hinge assembly when the notebook type personal computer is in a state of FIG. 9.
Figure 11:
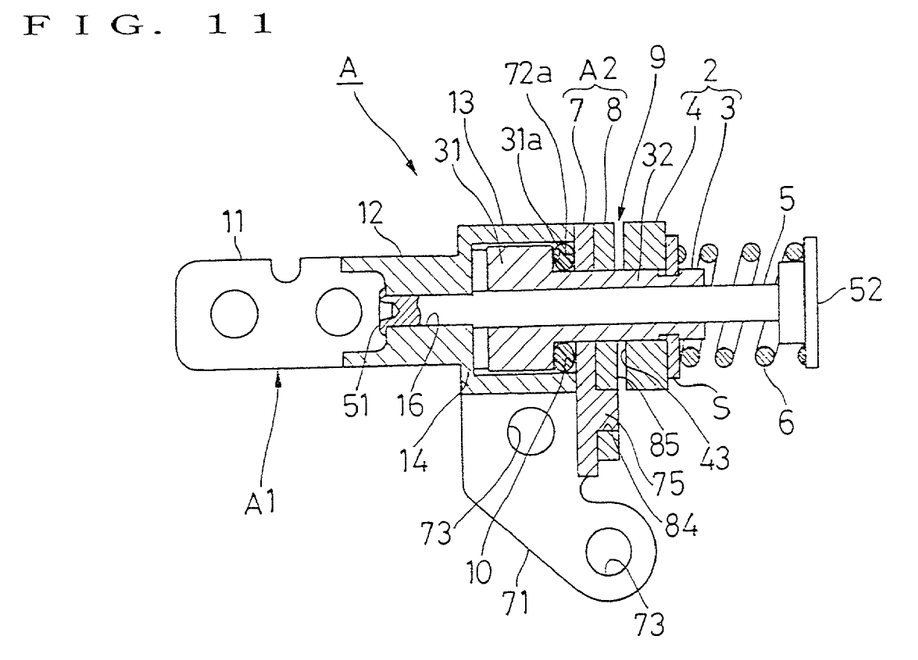
FIG. 11 is a sectional view, like FIG. 5, of FIG. 10.

The hinge member A1 includes, as shown in FIGS. 5, 8 and 11, a main body 1 and a movable portion 2.

Figure 12:
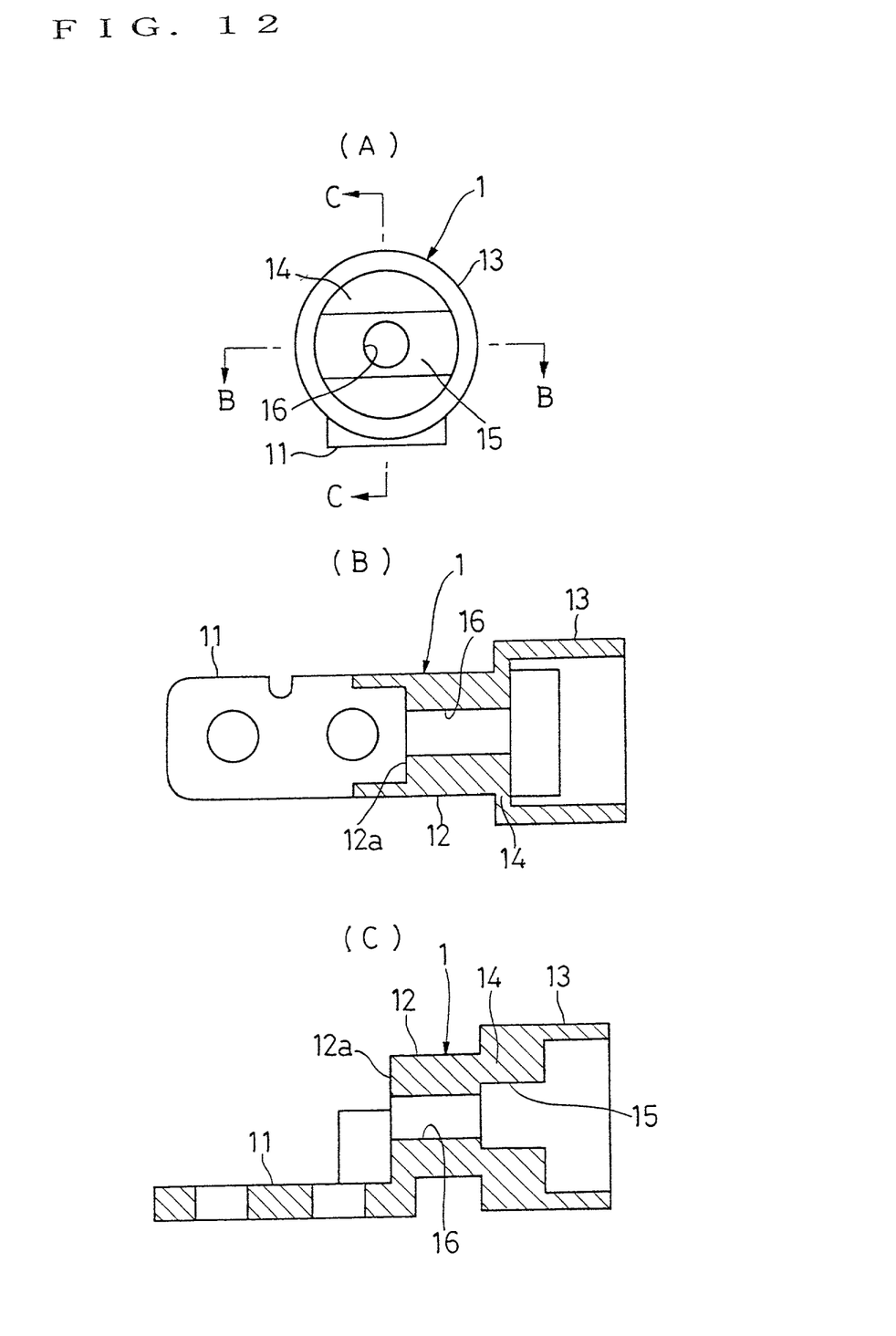
FIG. 12 is a view showing a main body of a first hinge member of the hinge assembly.

The main body 1, as shown in FIG. 12, has a planar fixing plate portion 11 formed on a basal end portion thereof, a fitting portion 12 having a circular configuration in section and formed on an intermediate portion thereof, and a receiving cylindrical portion 13 having a circular configuration in section and formed on a distal end portion thereof. The fitting portion 12 and the receiving cylindrical portion 13 is coaxial with each other. The fixing plate portion 11 is inserted into the connecting cylindrical portion B1 of the device main body B, and the fitting portion 12 is fitted to the connecting cylindrical portion B1. The fitting plate portion 21 is fixed to the connecting cylindrical portion B1 by the screws D, thereby the main body 1 (first hinge member A1) is fixed to the device main body B of the notebook type personal computer. In this fixed condition, the axis of the receiving cylindrical portion 13 is aligned with the axis of the connecting cylindrical portion B1. The receiving cylindrical portion 13 projects outside from the connecting cylindrical portion B1.

The receiving cylindrical portion 13 has an engagement recess 15 formed in a bottom portion 14 thereof and extending in a radial direction of the receiving cylindrical portion 13. The fitting portion 12 has a through hole 16 formed therein and extending from an end face on a basal end side (left side in FIG. 12) thereof to a bottom surface of the engagement recess 15. This through hole 16 is coaxial with the receiving cylindrical portion 13.

A basal end portion of the movable portion 2 is inserted in the receiving cylindrical portion 13 of the main body 1. The movable portion 2 includes an insertion member 3 and an abutment member (first opposing portion) 4.

Figure 13:
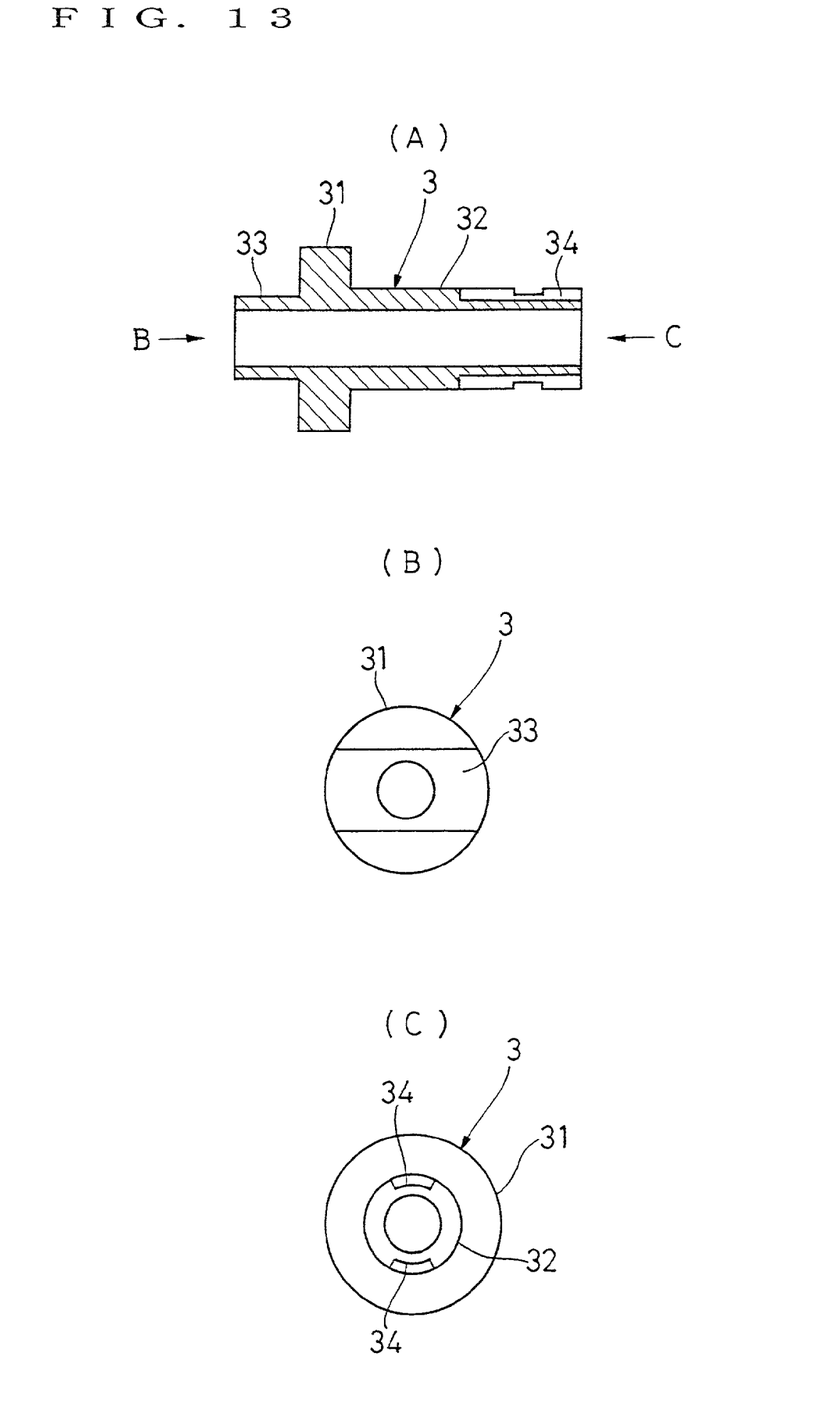
FIG. 13 is a view showing an insertion member of the first hinge member of the hinge assembly.

The insertion member 3, as shown in FIG. 13, is of a cylindrical configuration. The insertion member 3 has an enlarged diameter portion (second opposing portion) 31 formed on a basal end side thereof and a reduced diameter portion 32 formed on a distal end side thereof. The enlarged diameter portion 31 has an engagement projection 33 formed on an end face of the basal end side. The enlarged diameter portion 31 is inserted into the receiving cylindrical portion 13 and the engagement projection 33 is inserted in the engagement recess 15, thereby the insertion member 3 is connected to the main body 1 such that the insertion member 3 is non-turnable but movable in an axial direction (rotation axis direction) of the receiving portion 13. The engagement projection 33 is normally engaged with the engagement recess 15. This means that even when the insertion member 3 is moved to the limit on the distal end side, the engagement projection 33 is not brought out of the engagement recess 15. Accordingly, the insertion member 3 is normally non-turnably connected to the main body 1.

Figure 14:
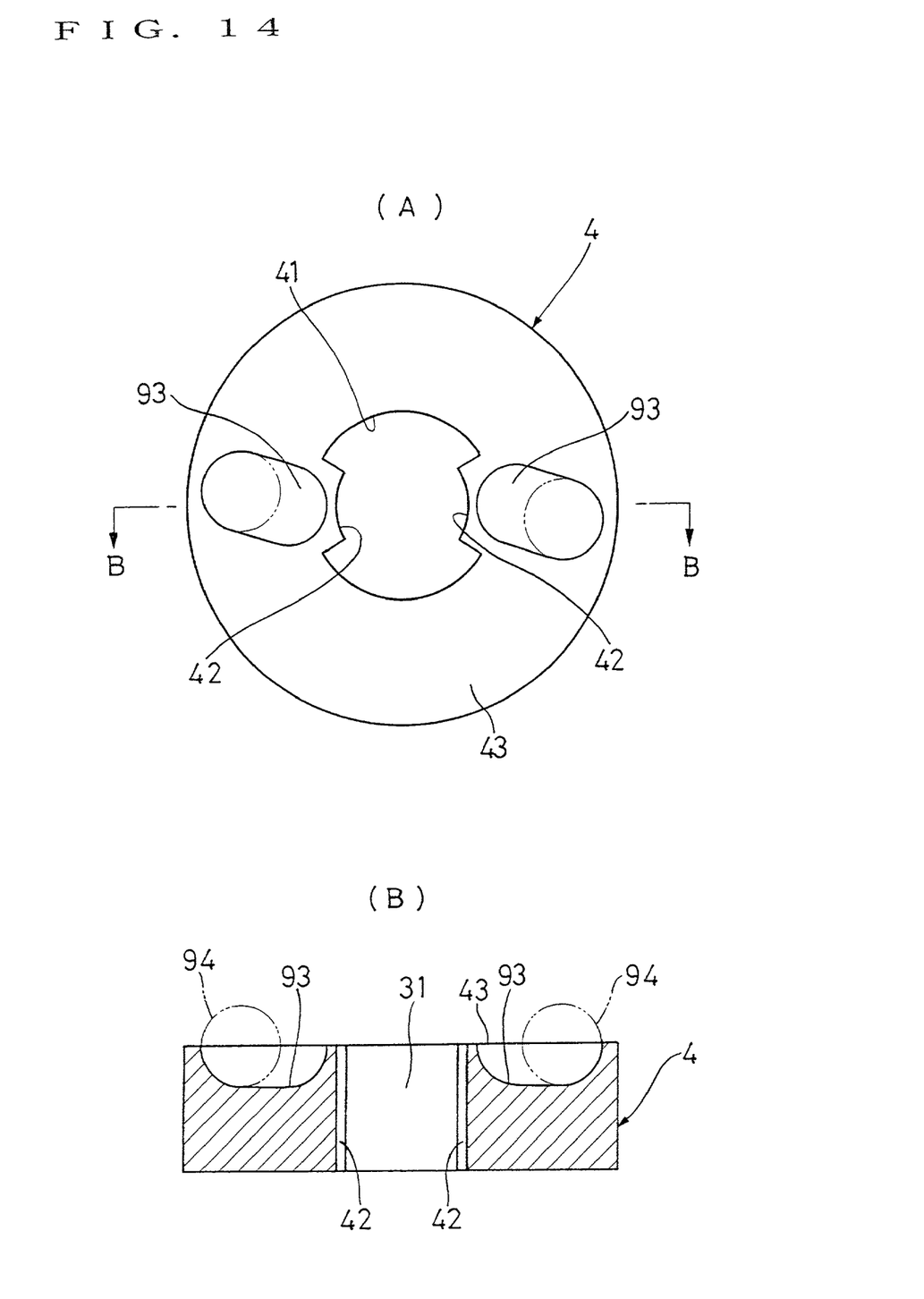
FIG. 14 is a view showing an abutment member of the first hinge member of the hinge assembly.

An abutment member 4 is disposed at a distal end portion of the reduced diameter portion of the insertion member 3. The abutment member 4, as shown in FIG. 14, is formed of a metal disc and has a through hole 41 formed in a central portion thereof. The reduced diameter portion 32 is slidingly movably inserted into this through hole 41. A key portion 42 is formed on an inner peripheral surface of the through hole 41. The key portion 42 is slidingly movably fitted to a key groove 34 (see FIG. 13) formed on an outer peripheral surface of the reduced diameter portion 32, thereby the abutment member 4 is connected to the reduced diameter portion 32 such that the abutment member 4 is non-turnable but movable in the axial direction of the reduced diameter portion 32. The abutment member 4 is prevented from escaping from the distal end portion of the reduced diameter portion 32 by a stopper S which is disposed at the distal end portion of the reduced diameter portion 32. The stopper S is movable in the axial direction of the reduced diameter portion 32 within a predetermined range. The stopper 3 prevents only the movement of the abutment member 4 towards the distal end side exceeding the predetermined range and does not prevent any other movement of the abutment member 4.

A shaft body 5 is inserted into the insertion member 3. One end portion of the shaft body 5 is pierced through the through hole 16 of the main body 1. An end portion of the shaft body 5 projects towards the basal end side of the hinge assembly A from the through hole 16. This projecting end portion of the shaft body 5 is caulked to form an enlarged diameter portion 51. This enlarged diameter portion 51 is abutted with an end face 12a of the fitting portion 12 on the basal end side, thereby the shaft body 5 is non-movable in a direction from the basal end side of the hinge assembly A towards the distal end side. The other end portion of the shaft body 5 is pierced through the through hole 16 and the insertion member 3 and is projected towards the distal end side of the hinge assembly A. A disc-like head portion 52 is formed on this projecting distal end portion.

A coiled spring (biasing means) 6 is attached to an outside of the shaft body 5 located between the head portion 52 and the stopper S. One end portion of the coiled spring 6 is abutted with the abutment member 4 through a stopper S. and the other end portion is abutted with the head portion 52. As a result, the enlarged diameter portion 51 is brought into abutment with the end face 12a of the main body 1 and the shaft body 5 is held in a predetermined position with respect to the main body 1. On the other hand, the abutment member 4 is biased towards the basal end side of the hinge assembly A from the distal end side. The coiled spring 6 may be abutted directly with the abutment member 4.

Figure 15:
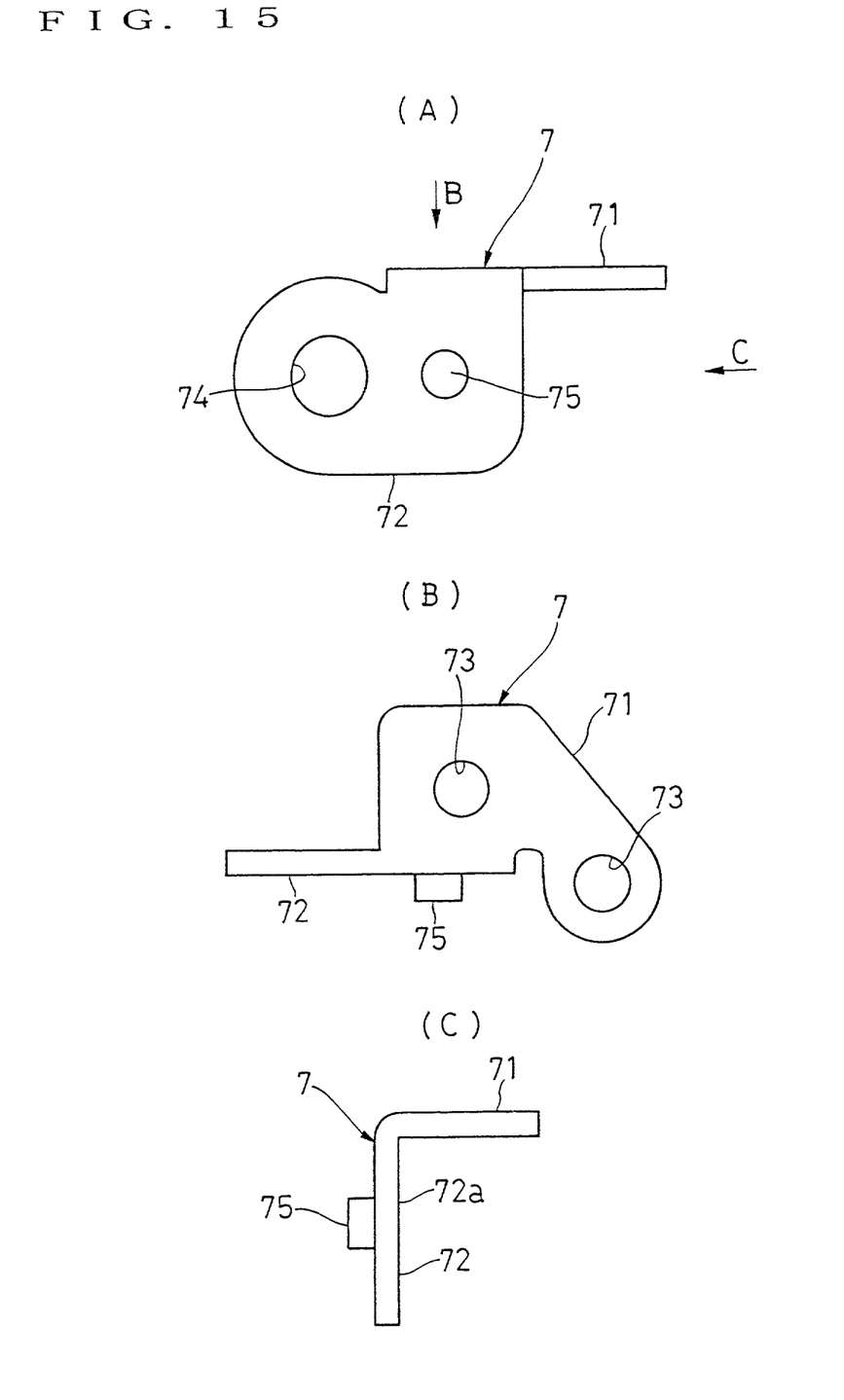
FIG. 15 is a view showing a fixing member of a second hinge member of the hinge assembly.

The second hinge member A2 includes a fixing member 7 and a cam member 8. The fixing member 7, as shown in FIG. 15, is formed by pressing a metal plate and includes an attachment plate portion 71 and a connecting plate portion 72 which are disposed orthogonal to each other. A plurality of insertion holes 73 are formed in the attachment plate portion 71. A screw (not shown) is inserted into each insertion hole 73, and is threadingly inserted into each attachment cylindrical portion C1 of the cover C. By tightening the screw 73, the attachment plate portion 71 is fixed to the cover C.

A fitting hole 74 is formed in the connecting plate portion 72 of the fixing member 7. A basal end portion of the reduced diameter portion 32 of the insertion member 3 is inserted into this fitting hole 74 such that the insertion member 3 is turnable and axially movable. By this, the second hinge member A2 is turnably connected to the first hinge member A1 and thus, the cover C is turnably connected to the device main body B about an axis of rotation (axis of the connecting cylindrical portion B1).

Figure 16:
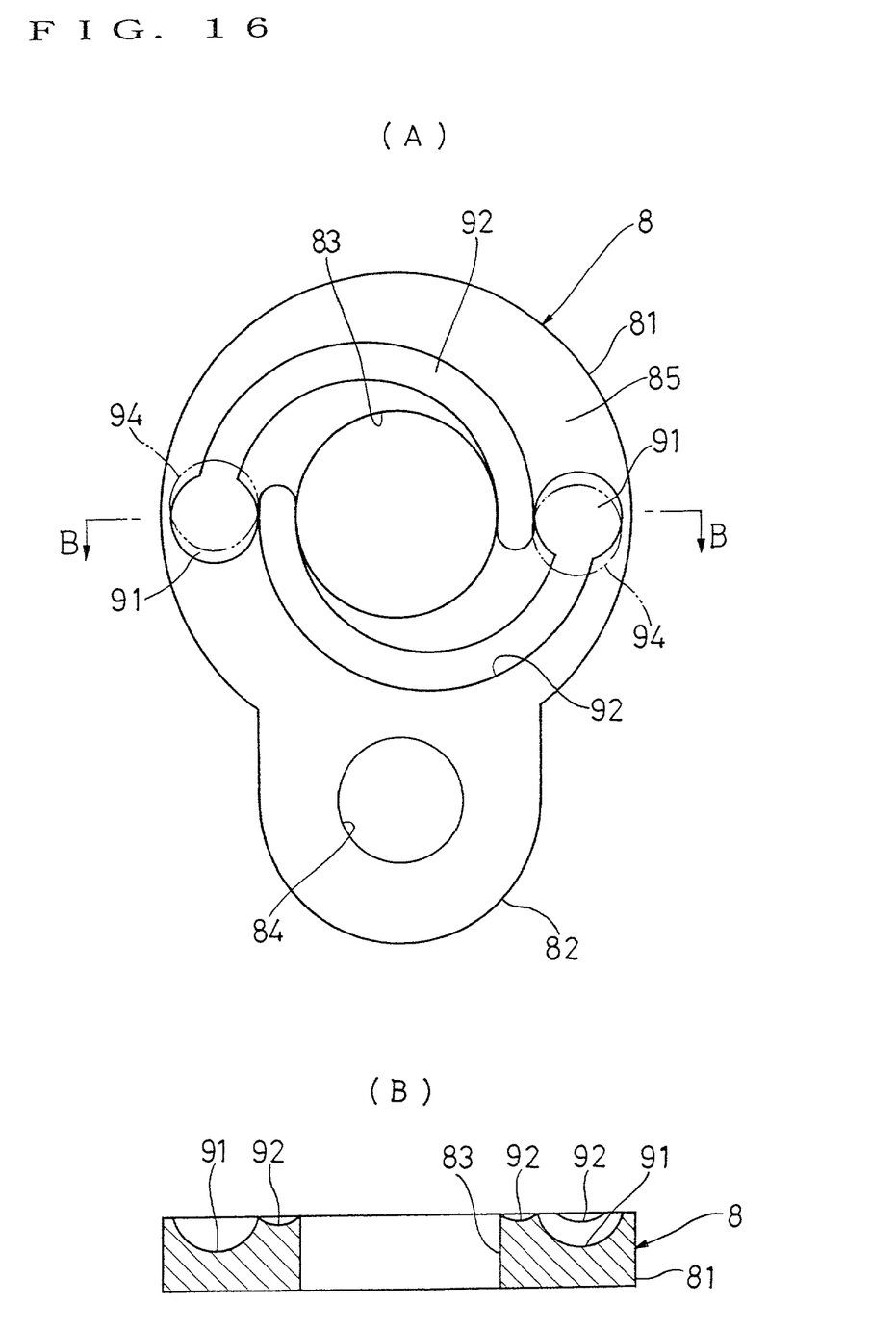
FIG. 16 is a view showing a cam member of the second hinge member of the hinge assembly.

The cam member 8 is in the form of a metal plate. As shown in FIG. 16, the cam member 8 includes a disc portion 81 having an outside diameter generally equal to an outside diameter of the receiving cylindrical portion 13 and a side plate portion 82 having a generally semi-circular configuration and integrally formed on one side portion of an outer peripheral surface of the disc portion 81. A through hole 83 is formed in a central area of the disc portion 81. The reduced diameter portion 32 is turnably and axially movably inserted in the through hole 83. On the other hand, an engagement hole 84 is formed in a central area of the side plate portion 82. An engagement projection 75 formed on the connecting plate portion 72 of the fixing member 7 is engaged with the engagement hole 84. By this, the cam member 8 is non-turnably connected to the fixing member 7 so that the cam member 8 is turned in unison with the fixing member 7. Since an outside diameter of the engagement projection 75 is dimensioned slightly smaller than an inside diameter of the engagement hole 84, the cam member 8 is turnable relative to the fixing member 7 by a fine angle corresponding to the difference between the outside diameter of the engagement projection 75 and the inside diameter of the engagement hole 84. The outside diameter of the engagement projection 75 may be dimensioned equal to the inside diameter of the engagement hole 84. In that case, since the cam member 8 and the fixing member 7 are normally turned in unison, the cam member 8 and the fixing member 7 may be integrally formed instead of being formed as separate members.

The outside diameter of the disc portion 81 of the cam member 8 is dimensioned generally equal to the outside diameter of the abutment member 4. Opposing surfaces of the disc portion 81 and the abutment member 4, i.e., an end face 85 of the disc portion 81 facing the distal end side of the hinge assembly A and an end face 43 of the abutment member 4 facing the basal end side of the hinge assembly A are abutted with each other by the coiled spring 6 through a spherical body 94 as later described. Accordingly, the cam member 8 is biased towards the basal end side of the hinge assembly A by the coiled spring 6 and abutted with the connecting plate portion 72 of the fixing member 7. As a result, the connecting plate portion 72 of the fixing member 7 is also biased towards the basal end side of the hinge assembly A and abutted with a distal end face of the receiving cylindrical portion 13. By this, the second hinge member A2 is, in a normal condition, positionally fixed. That is, the second hinge member A2 is positionally fixed unless a larger force than the biasing force of the coiled spring 6 acts on the second hinge member 2 from the basal end side towards the distal end side of the hinge assembly A.

A click mechanism (interval regulating mechanism) 9 is disposed between the end face 43 of abutment member 4 and the end face 85 of the cam member 8. That is, as shown in FIG. 16, one pair of positioning recesses 91, 91 are formed in the end face 85 of the cam member 8. The pair of positioning recesses 91, 91 each have a semi-spherical configuration and are arranged 180 degrees away from each other in a circumferential direction of the disc portion 81.

One pair of guide grooves 92, 92 are formed in the end face 85. Each guide groove 92 has an arcuate configuration in section. A radius of curvature of the guide groove 92 is set equal to that of the positioning recess 91. The depth of the guide groove 92 is much smaller than that of the positioning recess 91. One of the guide grooves 92 is spirally extended over a generally semi-circumference of the disc portion 81 from a generally central area of one of the positioning recesses 91 and generally contacted with an inner side of the other positioning recess 91. Likewise, the other guide groove 92 is spirally extended over a generally semi-circumference of the disc portion 81 from the generally central area of the other positioning recess 91 and generally contacted with the inner side of the first-mentioned guide groove 92.

On the other hand, one pair of driving recesses 93, 93 are arranged on the end face 43 of the abutment member 4 in such a manner as to be away 180 degrees from each other in the circumferential direction. Each driving recess 93 is extended in an inside and outside direction with a slightly inclined posture with respect to a radial direction of the abutment member 4. Opposite end portions of the driving recess 93 has a generally same spherical configuration as the positioning recess 91. An intermediate portion of the driving recess 93 has an arcuate configuration in section. A radius of curvature of the intermediate portion of the driving recess 93 is same as that of each opposite end portion thereof. The depth of each driving recess 93 is generally fixed over its entire length.

The spherical body 94 is partly inserted in the driving recess 93. This spherical body 94 has a generally same radius as the radius of curvature of the driving recess 93. The remaining part of the spherical body 94 is projected from the driving recess 93. This projecting part of the spherical body 94 is fitted in the positioning recess 91 or guide groove 92 of the cam member 8 by being biased towards the cam member 8 side by the biasing force of the coiled spring 6 through the abutment member 4. The selective insertion of the spherical body 94 into the positioning recess 91 or the guide groove 92 is determined by the turning position of the cam member 8 (second hinge member A2). That is, the positioning recess 91 and the driving recess 93 are arranged such that when the cover C is turned from the closed position towards the open position side but still located within a range of a predetermined angle, a part of the spherical body 94 is brought into the positioning recess 91. When the cover C is turned beyond the predetermined range, the spherical body 94 is brought into the guide groove 92. When the cover C is turned into the fully open position, the spherical body 94 is moved to the distal end portion of the guide groove 92. At that time, the spherical body 94 is moved within the driving recess 93 in a longitudinally direction thereof because the guide groove 92 is extended spirally.

When the cover C (second hinge member A2) is turned in a direction (direction indicated by an arrow X of FIGS. 3 and 4) towards the closed position side from the open position side, an outer peripheral surface of the engagement projection 75 facing in the direction as indicated by the arrow X is press contacted with an inner peripheral surface of the engagement hole 84. When the cover C is brought into a position by a predetermined angle this side of the closed position, the center of the spherical body 94 is located on a crossing ridgeline between the positioning recess 91 and the guide groove 92, and when the cover C is further turned towards the closed position side, the spherical body 94 comes into contact with an inclination surface between a crossing portion with respect to the guide groove 92 and the center of curvature of the positioning recess 91, which inclination surface is a part of a bottom surface constituting the positioning recess 91. In that state, the spherical body 94 is pushed in a direction as indicated by an arrow Y by the biasing force of the coiled spring 6, while a wall surface of the positioning recess 91, i.e., cam member 8, is pushed in the direction (direction from the open position side towards the closed position side) as indicated by the arrow X. By this pushing force, the cam member 8 is abruptly turned in the direction as indicated by the arrow X by a difference in diameter between the engagement projection 75 and the engagement hole 84 and the engagement projection 75 is abutted with the inner peripheral surface of the engagement hole 8. By this, impact and a sound of impact (clicking sound) are produced. Generally simultaneously with this, the cover C is brought into the closed position. Accordingly, it can be known from the impact and the sound of impact that the cover C has been brought into the closed position.

Since the cover C is still kept pushed in the direction as indicated by the arrow X by the actions of the coiled spring 6, the positioning recess 91 and the spherical body 94 even after the cover C is brought into the closed position, the cover C is kept in the closed position.

A friction member 10 is disposed between mutually opposing end faces (contact surfaces) 72a, 31a of the connecting plate portion 72 of the fixing member 7 of the second hinge member A2 and the enlarged diameter portion 31 of the insertion member 3. This friction member 10 is composed of an elastic material such as a rubber as in an O-ring. An outside diameter of the friction member 10 is generally same as the inside diameter of the receiving cylindrical portion 13. However, the outside diameter of the friction member 10 is preferably slightly larger than the inside diameter of the receiving cylindrical portion 13. The thickness of the friction member 10, i.e., the thickness in the axial direction of the receiving cylindrical portion 13, is set to generally equal to or slightly larger than the maximum distance between the end faces 72a, 31a.

The interval between the end face 72a and the end face 31a is established in the following manner. The position of the end face 72a is fixed by being abutted with the distal end face of the receiving cylindrical portion 13. On the other hand, when the insertion member 3 is moved in the direction of the axis of rotation, the end face 31a is also moved in the same direction. Since the abutment member 4 is abutted with the insertion member 3 through the stopper S, when the abutment member 4 is moved towards the distal end side of the hinge assembly A, the insertion member 3 is also moved towards the distal end side of the hinge assembly A together with the abutment member 4. As a result, the interval between the end faces 72a, 31a is reduced. Reversely, when the abutment member 4 is moved towards the basal end side of the hinge assembly A, the insertion member 3 becomes to be able to move towards the basal end side of the hinge assembly A and the insertion member 3 is moved towards the basal end side of the hinge assembly A by the friction member 10. As a result, the interval between the end faces 72a, 31a is increased. Accordingly, the interval between the end faces 72a, 31a becomes largest when the cover C is located in the closed position and the spherical body 94 is brought into the positioning recess 91. The reason is as follows. When the spherical body 94 is brought into the positioning recess 91, the spherical body 94 is moved towards the basal end side of the hinge assembly A compared with the case in which the spherical body 94 is brought into the guide groove 92 and the abutment member 4 is also moved towards the basal end side of the hinge assembly A. Since the thickness of the friction member 10 is set generally equal to the largest interval between the end faces 72a, 31a, a frictional resistance is hardly generated between the friction member 10 and the fixing member 7 when the cover C is located in the closed position or in a nearby position of the closed position. This arrangement is made so that after the generation of the impact sound, the cover C is immediately turned into the closed position by the biasing force of the coiled spring 6. On the other hand, when the cover C is turned a predetermined angle or more, towards the open position side from the closed position, the spherical body 94 is brought out of the positioning recess 91 and brought into the guide groove 92. Then, the spherical body 94 is moved towards the distal end side of the hinge assembly A and the abutment member 4 is moved in the same direction. As a result, the interval between the end faces 72, 31a becomes smallest and the opposite end faces of the friction member 10 are press contacted with the end faces 72a, 31a, respectively. Accordingly, when the first and second hinge members A1, A2 are about to be relatively turned or are relatively turned, a frictional resistance for prohibiting the relative turning motion is generated between the insertion member 3 of the first hinge member A1 and the fixing member 7 of the second hinge member A2. This frictional resistance is fixed irrespective of the turning position of the cover C and is set larger than the rotational torque caused by the dead weight of the cover C. Thus, the cover C can be stopped in an optional position with respect to the device main body B.

As described above, since the spherical body 94 is moved in the axial direction of the hinge assembly A when the spherical body 94 is brought into the positioning recess 91 from the guide groove 92 or when the spherical body 94 is brought into the guide groove 92 from the positioning recess 91, the interval between the end faces 72a, 31a is varied depending on the movement of the spherical body 94. As apparent from this, a moving mechanism (cam mechanism) for moving the insertion member 3 and the abutment member 4 (movable portion 2) in the direction of the axis of the hinge assembly A is constructed by the wall surface of the positioning recess 91 in a nearby area of the crossing portion between the positioning recess 91 and the guide groove 92 and the spherical body 94.

In the hinge assembly 1 thus constructed, the size of the frictional resistance of the friction member 10 acting on the first and second hinge members A1, A2 is established by the interval between the end face 31a of the enlarged diameter portion 31 of the insertion member 3 of the first hinge member A1 and the end face 72a of the connecting plate portion 72 of the fixing member 7 of the second hinge member A2. Accordingly, there is no need for using a coiled spring having an enlarged diameter and so, the hinge assembly 1 can be made smaller in size to that extent. Moreover, the interval between the end faces 31a, 72a can be adjusted more easily than adjusting the biasing force of the coiled spring. Accordingly, the interval between the end faces 31a, 72a can be easily be adjusted to a predetermined value and the frictional resistance caused by the friction member 10 can correctly be set to a desired value. Thus, the turning resistance with respect to the cover C can be generally fixed without being varied depending on individual notebook personal computers.

It should be noted here that the present invention is not limited to the above embodiment and that many changes and modifications can be made in accordance with necessity.

For example, in the above embodiment, the insertion member 3 is movable in the direction of the axis of rotation with respect to the main body 1, and the end face 31a press contacted with the friction member 10 is positioned by the click mechanism 9, thereby the interval between the end faces 31a, 72a contacting with the friction member 10 is established. It is accepted, however, that the insertion member 3 (movable portion 2) is integrally formed on the main body 1 to thereby fix the position of the end face 31a. In that case, the interval between the end faces 31a, 72a is established by the receiving cylindrical portion 13, and the receiving portion 13 serves as an abutment portion for establishing the interval between the end faces 31a, 72a.

Moreover, in the above embodiment, although the depth of the guide groove 92 is fixed over the entire length, the depth of the guide groove 92 may be varied at a specific part or parts of the guide groove 92 in the longitudinal direction. For example, it is accepted that the depth of the guide groove 92 is set such that the depth is smallest at the opposite end portions and largest at the position where the spherical body 94 is located when the cover C is turned in to a half open position of FIG. 6. By doing so, the frictional resistance can be increased the most when the rotation moment caused by the dead weight of the cover C is largest and the frictional resistance can be decreased the most when the rotation moment caused by the dead weight of the cover C is smallest. In that case, the guide groove 92 also constitutes a part of the moving mechanism (cam mechanism).

The spherical body 94 may be integrally formed on the abutment member 4 as a projection. In that case, however, since the projection is non-movable in the radial direction, it is necessary to form the guide groove 92 along the circumference instead of being formed spirally.

What is claimed is:

1. A hinge assembly comprising a first and a second hinge member relatively turnably connected together about an axis of rotation and a friction member composed of an elastic material and disposed between said first and second hinge members, relative turning motion between said first hinge member and said second hinge member being restricted by friction resistance generated between contact surfaces of said friction member and said first and second hinge members, said first hinge member includes a main body and a movable portion disposed on said main body such that said movable portion is non-turnable but movable in a direction of the axis of rotation, said friction member is disposed between said movable portion and said second hinge member, interval restricting means disposed between said movable portion and said second hinge member and adapted to restrict intervals of the contact surfaces of said movable portion and said second hinge member with respect to said friction member, said interval restricting means includes a moving mechanism for moving said movable portion in the direction of the axis of rotation in response to the turning motion of said second hinge member within a predetermined turning range.

2. A hinge assembly according to claim 1, wherein said interval restricting means includes an abutment portion disposed at least at one of opposing surfaces of said movable portion and said second hinge member and for restricting the intervals of said contact surfaces of said movable portion and said second hinge member with respect to said friction member by being abutted with the other opposing surface.

3. A hinge assembly according to claim 1, wherein said movable portion includes an insertion member connected to said main body such that said insertion member is non-turnable but movable in the direction of the axis of rotation and axially pierced through said second hinge member such that said insertion member is turnable and movable in a direction of the axis of rotation, and a first and second opposing portions disposed at opposite end portions of said insertion member and opposing to opposite end faces of said second hinge member, said interval restricting means is disposed between said first opposing portion and said second hinge member, and said friction member is disposed between said second opposing portion and said second hinge member.

4. A hinge assembly according to claim 3, wherein said moving mechanism moves said insertion member in the direction of the axis of rotation in response to the turning motion of said second hinge member within the predetermined turning range.

5. A hinge assembly according to claim 4, wherein said moving mechanism includes biasing means for biasing said insertion member so that said first opposing portion is brought towards said second hinge member, and a cam mechanism disposed between said second opposing portion and said second hinge member and for moving said insertion member against biasing force of said biasing means so that when said hinge member is turned in one direction, said second opposing portion is brought away from said second hinge member, and for moving said insertion member by the biasing force of said biasing means so that when said second hinge member is turned in the other direction, said second opposing portion is brought towards said second hinge member.

* * * * *